(12) United States Patent
Scaggs

(10) Patent No.: US 8,427,633 B1
(45) Date of Patent: Apr. 23, 2013

(54) LASER BEAM ANALYSIS APPARATUS

(75) Inventor: Michael J. Scaggs, Weston, FL (US)

(73) Assignee: Haas Laser Technologies, Inc., Flanders, NJ (US)

( * ) Notice: Subject to any disclaimer, the term of this patent is extended or adjusted under 35 U.S.C. 154(b) by 0 days.

(21) Appl. No.: 13/481,288

(22) Filed: May 25, 2012

Related U.S. Application Data

(62) Division of application No. 12/756,476, filed on Apr. 8, 2010, now Pat. No. 8,237,922.

(51) Int. Cl.
*G01J 1/00* (2006.01)

(52) U.S. Cl.
USPC .......................................... 356/121; 356/122

(58) Field of Classification Search .................. 356/121, 356/225, 234, 6, 138, 122; 359/856–857; 219/121.61, 121.62; 372/92
See application file for complete search history.

(56) References Cited

U.S. PATENT DOCUMENTS

| | | | |
|---|---|---|---|
| 4,384,198 A | 5/1983 | Williamson | |
| 5,064,284 A | 11/1991 | Johnston, Jr. et al. | |
| 5,069,527 A | 12/1991 | Johnston, Jr. et al. | |
| 5,078,491 A | 1/1992 | Johnston, Jr. | |
| 5,100,231 A | 3/1992 | Sasnett et al. | |
| 5,214,485 A | 5/1993 | Sasnett et al. | |
| 5,267,012 A | 11/1993 | Sasnett et al. | |
| 5,329,350 A | 7/1994 | Wright et al. | |
| 5,459,565 A | 10/1995 | Aharon | |
| 6,313,910 B1 | 11/2001 | Garvey et al. | |
| 2008/0165320 A1 | 7/2008 | Heiberger | |

FOREIGN PATENT DOCUMENTS

| | | | |
|---|---|---|---|
| JP | 59079122 A | 5/1984 | |
| JP | 2002176007 A | 6/2002 | |

OTHER PUBLICATIONS

International Preliminary Report on Patentability for PCT/US2011/031776, international filing date of Aug. 4, 2011. Report mailing date Oct. 18, 2012. Applicant: Haas Laser Technologies, Inc.
International Search Report for PCT/US2011/031776, filed Aug. 4, 2011. Report mailing date Feb. 1, 2012. Applicant Scaggs, Michael J.

*Primary Examiner* — Tri T Ton
(74) *Attorney, Agent, or Firm* — Ronald E. Smith; Smith & Hopen, P.A.

(57) ABSTRACT

An apparatus that enables real time measurement of the spatial profile, circularity, centroid, astigmatism and M2 values of a laser beam generated by a high power laser beam. The apparatus employs the optics used in a process application, including a focus lens and cover glass. An attenuation module includes a pair of high reflecting mirror plates disposed in parallel, spaced apart relation to one another at a common angle of incidence to the laser beam. A beam dump is positioned out of a path of travel of the laser beam and in receiving relation to light reflected by the first and second mirrors. A camera detects spots of light that pass through the first and second mirrors. A high power attenuator formed by a highly reflective mirror pair is positioned between the source and the attenuation module. A second embodiment includes a single mirror plate having highly reflective surfaces.

8 Claims, 5 Drawing Sheets

LASER BEAM ANALYSIS APPARATUS

CROSS-REFERENCE TO RELATED APPLICATIONS

This application is a divisional of and claims priority to U.S. patent application Ser. No. 12/756,476, filed Apr. 8, 2010 by the same inventor, entitled "Laser Beam Analysis Apparatus."

BACKGROUND OF THE INVENTION

1. Field of the Invention

This invention relates, generally, to the art of analyzing laser beams. More particularly, it relates to the art of analyzing high power laser beams.

2. Description of the Prior Art

A conventional apparatus for analyzing a high power laser beam includes a rotating needle that acts like a knife edge. The rotating needle reflects a small sampling of the focused laser beam into a detector. The needle, as it is rotated, moves along an optical axis and measures the beam waist of a focused laser beam.

Primes GmbH sells a unit that is capable of measuring powers up to 10 kilowatts, CW. The unit requires careful alignment and takes many minutes to make a measurement. It is bulky and does not facilitate real time measurement in a production process.

Multiple patents, such as U.S. Pat. Nos. 5,064,284, 5,069,527, 5,078,491, 5,100,231, 5,214,485, 5,267,012 and 5,459,565, disclose methods of analyzing a multimode laser beam by passing it through a rotating knife edge followed by translating the focal point along the optical axis to a detector.

The drawback to this approach is that the apparatus is bulky and requires many moving parts. It therefore does not facilitate quick and real time analysis of the laser beam.

U.S. Pat. No. 5,329,350 discloses a method for analyzing a laser beam by attenuating the beam with a pair of wedges and a second attenuation assembly. The light is then passed through a lens and a series of partially reflective plates where the number of beams produced is two times the number of partially reflecting plates used and then directs the beam onto a detector to view multiple spots simultaneously.

This method requires quite a few optics and is generally limited to analyzing a laser beam with a long focal length lens. This limitation exists because stacking a series of plates limits the beam waist that can be measured and makes it difficult to fabricate thin plates that permit analyzing a beam with a focal length much less than about three hundred millimeters (300 mm).

The earlier inventions disclosed in the above-mentioned patents are not capable of analyzing the beam using all the optical components of a conventional material processing system. The prior art devices also require the laser beam to be measured off line.

U.S. Pat. No. 6,313,910 discloses a rotation of apertures that are displaced along the optical axis of the beam waist to be analyzed. This device is rather compact and permits a more real time measurement, but includes moving parts that slow the measurement process and offers no acceptable means of attenuation for analyzing lasers with powers in the tens of kilowatts.

Thus there is a need for an apparatus for analyzing high power laser beams that is small and free of moving parts, has a small number of optics, uses all the optical components of a conventional material processing system, and attenuates the beam in an acceptable manner so that the beam can be measured in situ.

However, in view of the art considered as a whole at the time the present invention was made, it was not obvious to those of ordinary skill in the art how the limitations of the art could be overcome.

SUMMARY OF THE INVENTION

The long-standing but heretofore unfulfilled need for a compact apparatus having no moving parts that analyzes laser beams on line in real time is now met by a new, useful, and non-obvious invention.

The novel apparatus enables real time measurement and analysis of the spatial profile, circularity, centroid, astigmatism and M2 values of a laser beam generated by a high power laser. The apparatus employs the optics used in a process application, including a focus lens and cover glass.

The novel apparatus employs a minimum number of optics to attenuate the high power laser beam and to provide a plurality of focused laser spots. Each spot represents a part of the focused beam waist of interest. Each spot impinges onto a single CCD, CMOS or any other pixilated detector or camera. The apparatus therefore provides real time data on the laser's beam properties.

More particularly, the inventive apparatus that enables analysis of high power laser beams includes an attenuation module that includes a pair of high reflecting mirror plates disposed in parallel, spaced apart relation to one another at a common angle of incidence to a laser beam.

The pair of high reflecting mirror plates includes a first mirror having an anti-reflection coating on a first surface thereof that faces a source of the laser beam and a highly reflective coating on a second surface thereof that faces away from the source.

The pair of high reflecting mirror plates further includes a second mirror having an anti-reflection coating on a second surface thereof that faces away from the source and a highly reflective coating on a first surface thereof that faces the source.

A first beam dump is positioned out of the path of travel of the laser beam and in receiving relation to light reflected by the first and second mirrors.

A first camera detects spots of light that pass through the first and second mirrors. The laser beam is substantially attenuated so that it can be analyzed by the first camera.

A focusing lens is disposed between the source and the attenuating multi-spot module and a dove prism is disposed between the source and the focusing lens. A second camera is disposed out of the path of travel of the laser beam and the dove prism has a first reflecting surface that reflects at least some light from the laser beam into the second camera.

A high power attenuator is formed by a highly reflective mirror pair and is disposed between the source and the dove prism. The highly reflective mirror pair includes a first highly reflective mirror having a first surface facing the source and a second highly reflective mirror having a first surface facing the source. A second beam dump is disposed out of the path of travel of the laser beam and the first highly reflective mirror reflects light from the source to the second beam dump. A third beam dump is disposed out of the path of travel of the laser beam as well and the second highly reflective mirror reflects light from the source to the third beam dump.

The first highly reflective mirror is positioned at a forty five degree angle relative to the path of travel of the laser beam and the second highly reflective mirror is positioned at a one hundred thirty five degree angle relative to the path of travel. The first highly reflective mirror causes a refraction-related displacement in the original path of travel and the second highly reflective mirror returns the laser beam to the original path of travel.

The first and second cameras are pixilated detectors. Each is provided in the form of a charge-coupled device, a complementary metal oxide semiconductor, or the like.

A primary object of this invention is to measure a high power (tens of kilowatts, CW) in situ with a conventional material processing system used for cutting, drilling, scribing, marking, welding or other treatment.

Another object is to provide an apparatus having no moving parts.

Another important objective is to minimize the number of optical elements and to avoid using neutral density filters.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
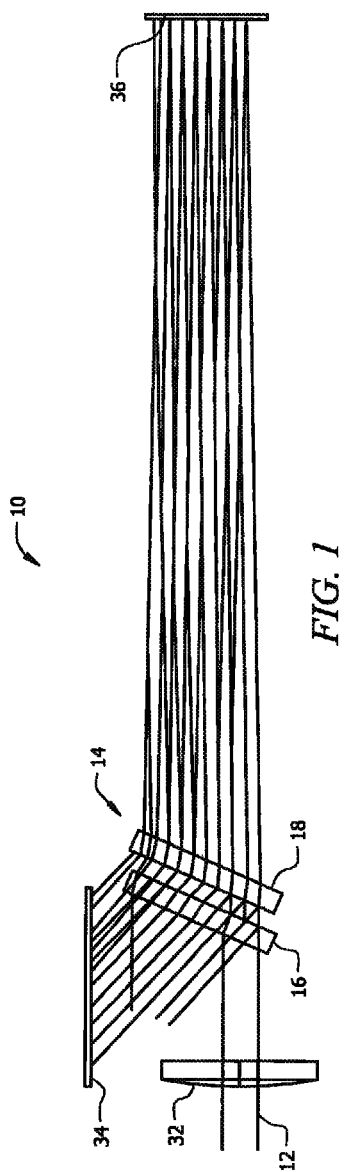
FIG. 1 is a diagram of the novel apparatus.

Referring now to FIG. 1, it will there be seen that a diagrammatic representation of the novel apparatus is denoted as a whole by the reference numeral 10.

Commercially available high power fiber laser have powers exceeding ten kilowatts (10 kW). Some have powers exceeding twenty kilowatts (20 kW). The novel apparatus accepts fiber laser beam 12 with a power greater then ten kilowatts into an attenuation module 14 that includes a pair of high reflecting mirror plates 16 and 18.

Figure 2:
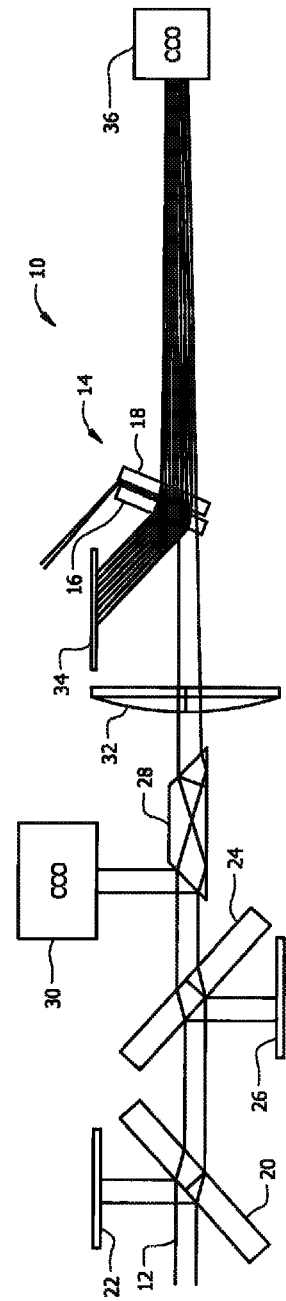
FIG. 2 is a diagram of the novel apparatus when configured for a high power laser.

When the novel apparatus is configured for a high power laser, as depicted in FIG. 2, laser beam 12 strikes first plate 20 which is oriented at a forty five degree (45°) angle of incidence. More than ninety nine percent (99%) of the light is reflected toward a first water-cooled high power beam dump 22 to dissipate the vast majority of the laser's power.

The small amount of light that passes through the highly reflective surface of first plate 20 strikes the second surface of first mirror plate 20 which is anti-reflection coated to minimize ghost reflections. The light then strikes second high reflecting mirror plate 24 oriented at a negative forty five degree (45°) angle of incidence, which may also be described as a one hundred thirty five degree (135°) angle of incidence. Second high reflecting mirror plate 24 compensates for the refraction-related beam walk-off created by first mirror plate 20 as depicted.

The roughly ninety nine percent (99%) of the light reflected by compensating high reflective mirror 24 is directed towards second water-cooled beam dump 26. Where ten kilowatts (10 kW) of laser power enters apparatus 10, first mirror 20 dumps about nine thousand nine hundred watts (9,900 W) into first liquid-cooled beam dump 22. About one hundred watts (100 W) then strikes second mirror 24 which directs ninety nine watts (99 W) into second liquid-cooled beam dump 26. One watt (1 W) of laser power is passed through second compensator plate 24.

Laser beam 12 is directed to dove prism 28 which is anti-reflection coated. The small reflection from the first surface of dove prism 28 is directed into charge-coupled device (CCD) 30, a complementary metal oxide semiconductor (CMOS) or other pixilated detector, not depicted, to measure the spatial profile, centroid, and ellipsivity of laser beam 12.

Most CCD and CMOS cameras have formats well under one inch diagonally. Therefore, a beam reduction telescope, not depicted, can be used to reduce the beam diameter into detector 30 because the diameter of a collimated, high power fiber laser can exceed one inch in diameter.

Dove prism 28 provides a ghost free reflection for beam profile camera 30 and the remaining beam propagates along the optical axis without deviation to focusing lens 32.

Figure 3:
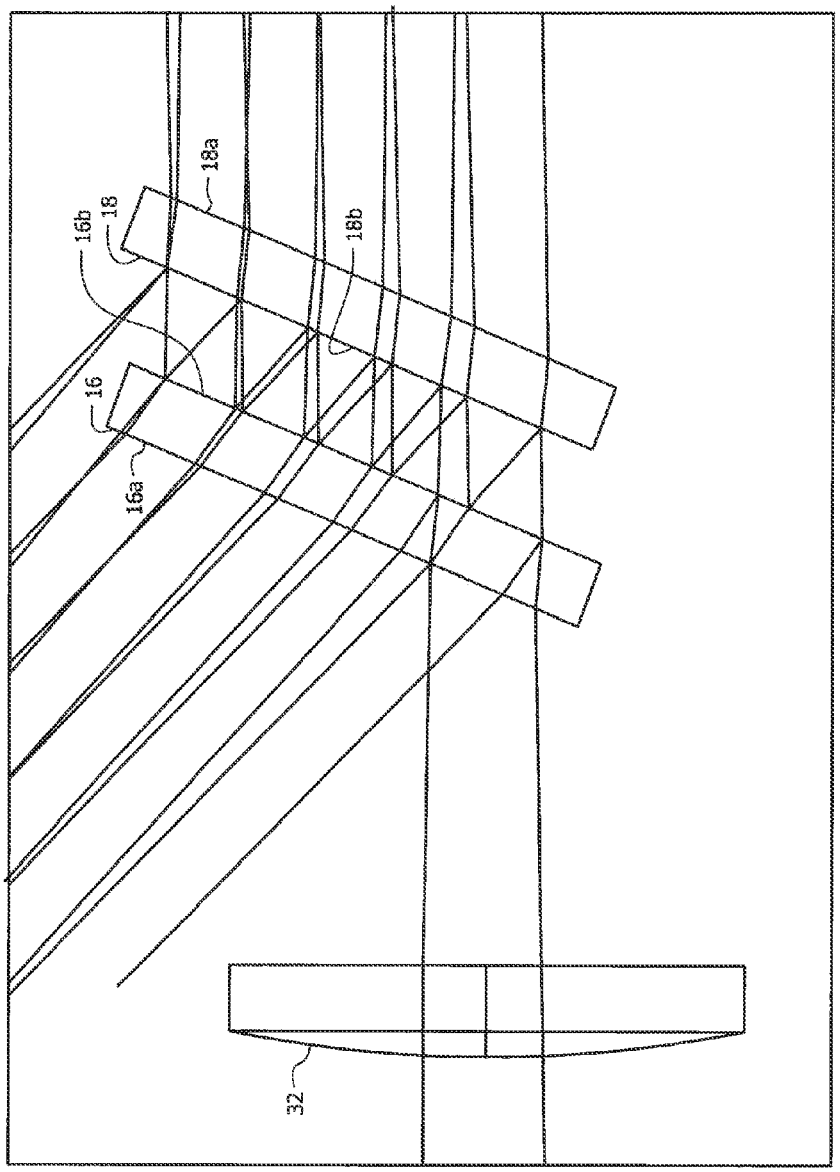
FIG. 3 is an enlargement of the reflecting surfaces of the embodiments of FIGS. 1 and 2, depicting how the light is both attenuated and split up into multiple beams with a fixed axial delay.

A pair of high reflecting mirrors 14 are anti-reflection coated on their respective high reflective surfaces 16a, 18a as denoted in FIG. 3. Said pair 14 is positioned downstream from focusing lens 32. Mirrors 16, 18 have respective high reflective surfaces 16b, 18b facing each other, also as denoted in FIG. 3. The spacing between mirrors 16, 18 is adjustable from a few microns to more than one millimeter (1 mm).

Second mirror 18 is further adjusted by a vertical and horizontal adjusting mount to align the two mirrors 14 so they are parallel to one another so as to form a fabry-perot resonator arrangement. The nominally one watt of attenuated power becomes incident on first mirror 16 by passing first through anti-reflection coated surface 16a and more than ninety nine percent (99%) of the laser light is reflected off first mirror 16 and sent onto simple beam dump 34 as depicted in FIGS. 1 and 2.

The residual light of about ten milliwatts (10 mW) passes through first high reflecting mirror 16 and strikes second high reflecting mirror 18. These two mirrors 14 are parallel to one another so about nine milliwatts (9 mW) of the reflected light propagates between these two mirrors. Each reflection loses about one percent (1%) of its power.

The one percent (1%) that passes through second mirror 18 is directed onto a suitable CCD, CMOS or other detector 36 as depicted in FIG. 2 to monitor a series of focal spots that are separated by a certain distance determined by the angle of the two mirrors 14 and the air gap between the two high reflective surfaces.

The delta of each consecutive spot along the optical axis is based upon the $2(d/\cos \pi)$ where d is the air spacing between mirrors 14 and $\alpha$ is the incident angle of the light on the mirror. The delta between spots on the detector decreases as spacing d decreases, thereby providing higher resolution of the beam waist measurement.

All of the multiple spots incident on camera 36 are analyzed with commercially available software to determine the waist of laser beam 12 at the focus of the lens of camera 36.

The position of camera 36 is set where the smallest spot is in the middle of the series of spots.

Novel system 10 can have a very large number of spots on camera 36, limited only by the detector size and the angle of mirror pair 14. If the incident angle of the light on mirror pair 14 is too small, it can create a condition where the light interferes with itself. The separation and angle of the mirrors is therefore adjusted to prevent such interference.

Figure 4:
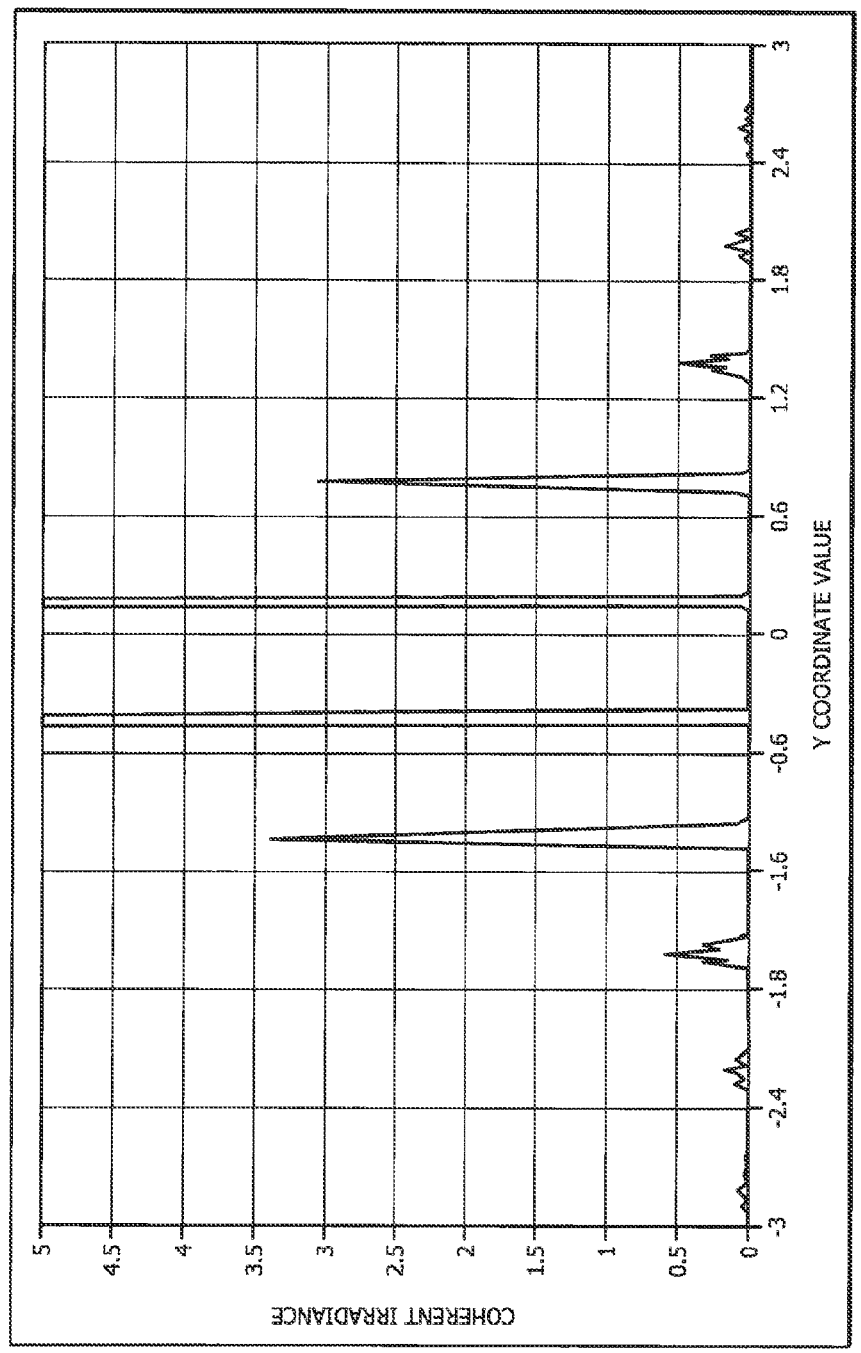
FIG. 4 is a graphical depiction of the intensity distribution of light focused on a pixilated detector and how the light is focused through the beam waist.

FIG. 4 is a graphical depiction of the intensity distribution of the light focused on a pixilated detector such as detector 36 and how the light is focused through the beam waist.

Figure 5:
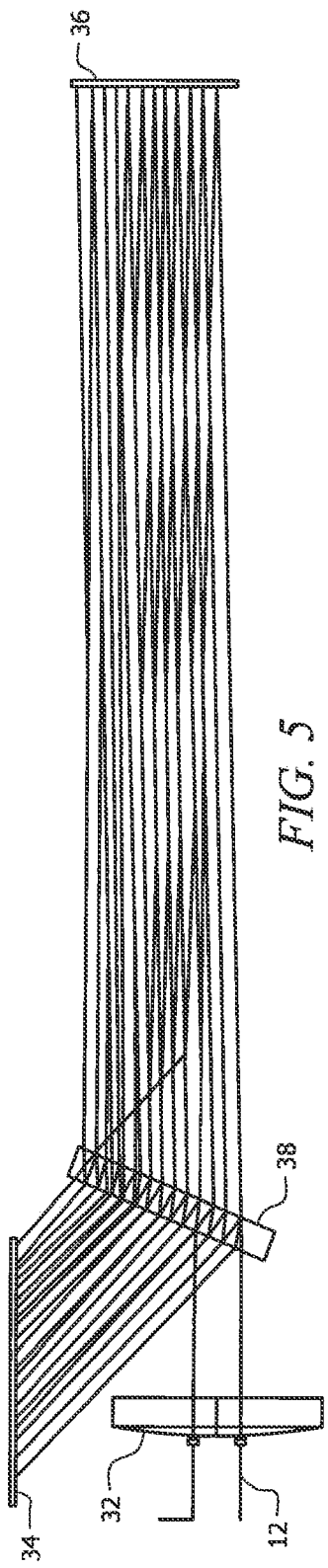
FIG. 5 depicts a second embodiment of the invention.

FIG. 5 depicts a second embodiment of the invention where single mirror 38 replaces mirrors 16, 18.

Figure 6:
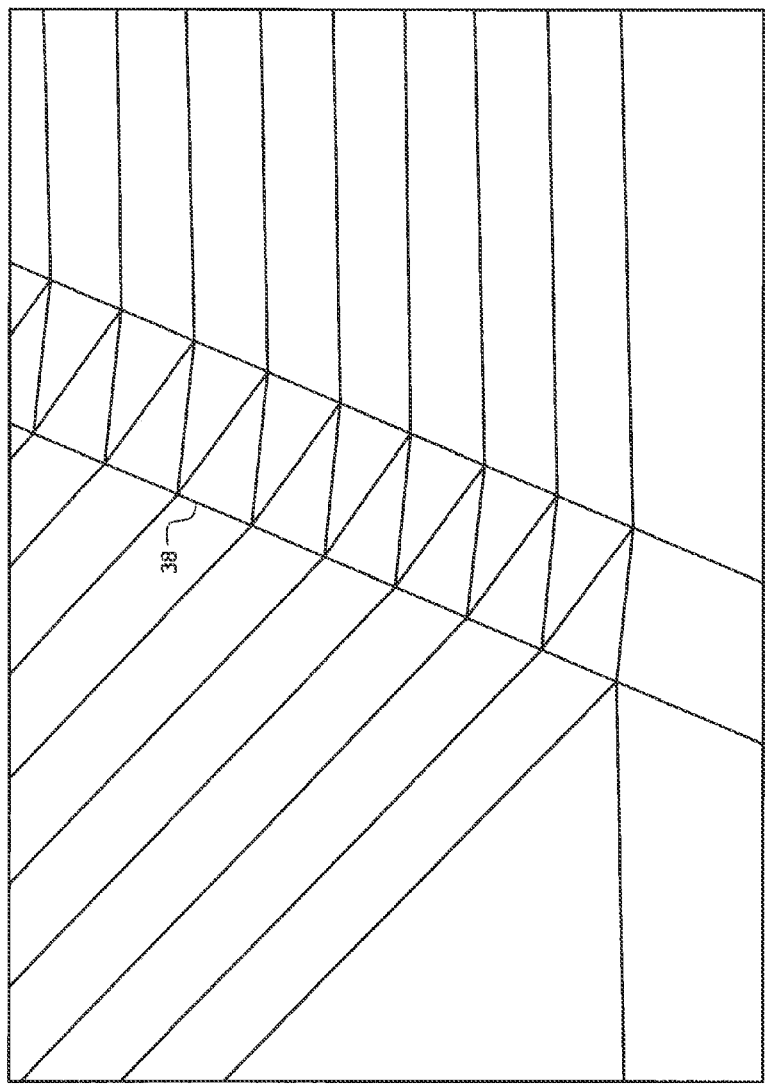
FIG. 6 is an enlarged view of the reflecting surfaces of the embodiment of FIG. 5.

FIG. 6 is a close up the reflecting surfaces of the embodiment of FIG. 5, depicting how the light is both attenuated and split up into multiple beams with a fixed axial delay.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. An apparatus that enables analysis of high power laser beams, comprising:
    a Fabry-Perot resonator that includes a thin, high reflecting mirror plate disposed at a predetermined angle of incidence to a laser beam;
    said high reflecting mirror plate including a first surface that faces a source of said laser beam, said first surface having a highly reflective non-absorbing coating that transmits less than one percent (1%) of light from said laser beam;
    said high reflecting mirror plate including a second surface that faces away from said source, said second surface having a highly reflective non-absorbing coating that transmits less than one percent (1%) of light from said laser beam;
    a first beam dump positioned out of a path of travel of said laser beam and in receiving relation to light reflected by said high reflecting mirror plate; and
    a first camera for detecting spots of light that pass through said high reflecting mirror plate;
    whereby said laser beam is substantially attenuated so that it can be analyzed by said first camera.

2. The apparatus of claim 1, further comprising:
    a focusing lens disposed between said source and said attenuating multispot module.

3. The apparatus of claim 2, further comprising:
    a dove prism disposed between said source and said focusing lens.

4. The apparatus of claim 3, further comprising:
    a second camera disposed out of said path of travel of said laser beam; and
    said dove prism having a first reflecting surface that reflects at least some light from said laser beam into said second camera.

5. The apparatus of claim 4, further comprising:
    a high power attenuator formed by a highly reflective mirror pair;
    said high power attenuator disposed between said source and said dove prism;
    said mirror pair including a first highly reflective mirror having a first surface facing said source;
    said mirror pair including a second highly reflective mirror having a first surface facing said source;
    a second beam dump disposed out of said path of travel of said laser beam;
    said first highly reflective mirror reflecting light from said source to said second beam dump;
    a third beam dump disposed out of said path of travel of said laser beam; and
    said second highly reflective mirror reflecting light from said source to said third beam dump.

6. The apparatus of claim 5, further comprising:
    said first highly reflective mirror being positioned at a forty five degree angle relative to said path of travel of said laser beam; and
    said second highly reflective mirror being positioned at a one hundred thirty five degree angle relative to said path of travel of said laser beam;
    whereby said first highly reflective mirror causes a displacement in said path of travel and said second highly reflective mirror returns said laser beam to said path of travel.

7. The apparatus of claim 1, further comprising:
    said first camera being a pixilated detector.

8. The apparatus of claim 4, further comprising:
    said second camera being a pixilated detector.

* * * * *